(12) United States Patent
Baer et al.

(10) Patent No.: US 8,512,185 B2
(45) Date of Patent: Aug. 20, 2013

(54) SWITCHABLE DRIVE PULLEY WITH ELECTRICALLY ACTUATED FRICTION DISC TORQUE TRANSFER MECHANISM

(75) Inventors: Benjamin Baer, Denfield (CA); Thomas Gillespie, Royal Oak, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 802 days.

(21) Appl. No.: 12/632,120

(22) Filed: Dec. 7, 2009

(65) Prior Publication Data
US 2010/0151979 A1 Jun. 17, 2010

Related U.S. Application Data

(60) Provisional application No. 61/122,093, filed on Dec. 12, 2008.

(51) Int. Cl.
*F16H 7/20* (2006.01)
(52) U.S. Cl.
USPC .......................................................... 474/199
(58) Field of Classification Search
USPC ...................................... 474/199; 123/41.46
See application file for complete search history.

(56) References Cited

U.S. PATENT DOCUMENTS

| | | | |
|---|---|---|---|
| 5,076,216 A | 12/1991 | Ro | |
| 5,603,289 A | 2/1997 | Kwan | |
| 6,021,747 A * | 2/2000 | Gee et al. | 123/41.12 |
| 6,725,812 B1 * | 4/2004 | Scott | 123/41.44 |
| 8,156,903 B2 * | 4/2012 | Guala et al. | 123/41.44 |
| 2008/0184945 A1 * | 8/2008 | Guala et al. | 123/41.44 |

FOREIGN PATENT DOCUMENTS

EP 1830045 5/2008

* cited by examiner

*Primary Examiner* — Sang Kim
(74) *Attorney, Agent, or Firm* — Volpe and Koenig, P.C.

(57) ABSTRACT

A switchable drive pulley system that allows driving engagement or disengagement of a pulley from the shaft of an accessory drive. The pulley is mounted to the shaft by a bearing having an inner ring that rotates with the shaft and an outer ring that rotates with the pulley. A friction disk is arranged adjacent to the bearing inner and outer ring. When axial pressure is applied to the friction disk, relative motion between the inner and outer bearing rings is stopped, allowing transfer of torque from the pulley to the shaft to drive the accessory drive, with the pulley and shaft rotating at the same speed. When pressure is removed from the friction disk, the pulley and the outer bearing ring can spin independently of the inner ring and shaft. The shaft can therefore remain stationary while the pulley continues to turn driven by the accessory belt drive.

8 Claims, 2 Drawing Sheets

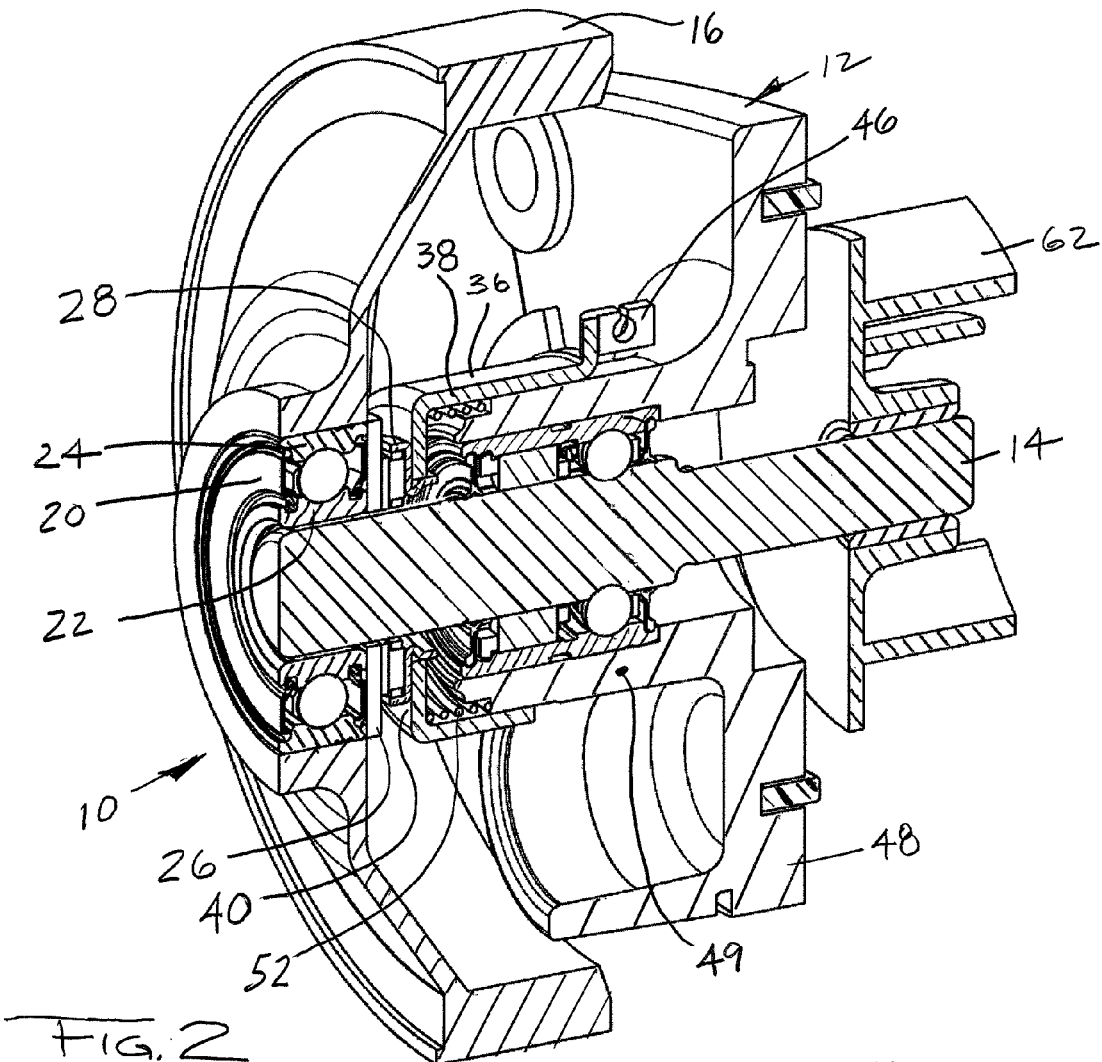
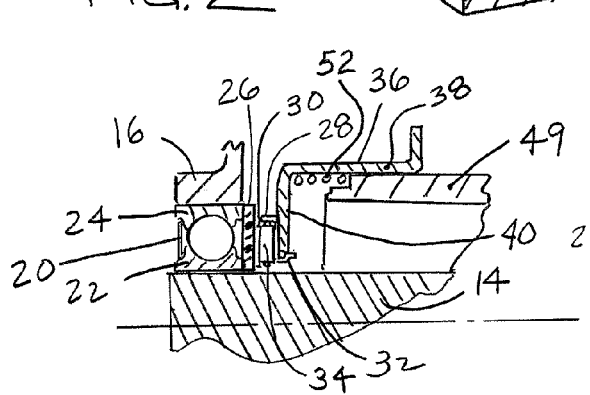 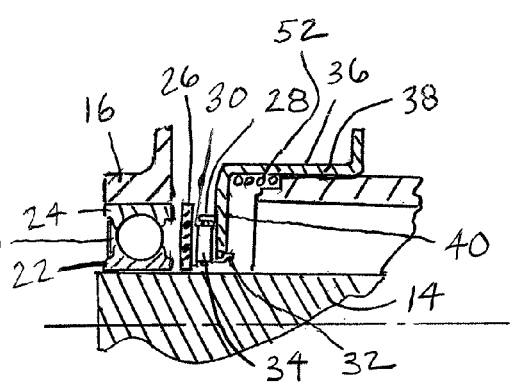

SWITCHABLE DRIVE PULLEY WITH ELECTRICALLY ACTUATED FRICTION DISC TORQUE TRANSFER MECHANISM

CROSS-REFERENCED TO RELATED APPLICATION

This application is a non-provisional of U.S. Provisional Patent Application No. 61/122,093, filed Dec. 12, 2008, which is incorporated herein by reference as if fully set forth.

FIELD OF INVENTION

The invention relates to a switchable drive pulley, preferably for an internal combustion engine, for operating an accessory drive, such as a water pump, alternator, etc. More particularly, the invention relates to a drive pulley which can be engaged to or released from driving engagement with the shaft of the accessory drive.

BACKGROUND

Conventional pulley drives are known which transfer torque via a traction element, such as a drive belt, that extends between a drive pulley and a driven pulley located on the shaft of an accessory drive in order to rotate the shaft. In conventional internal combustion engines, belt-pulley drives are typically used to drive the water pump, the alternator, the power steering pump and the air conditioning compressor, as well as potentially other accessory drive items. One drawback of the conventional arrangement is that the speed that the accessory drive is driven is proportional to the engine speed at all times. Often, the accessory drive devices are not needed or should not operate for certain engine conditions or at a speed proportional to the engine speed.

One alternative to this which is known in the art is to utilize an electric motor that is speed controllable. The electric motor is driven by the vehicle battery and charging system. However, this is expensive and increases the electrical load on the alternator and battery.

It has also been known to use a viscous coupling between the drive pulley and a pump shaft or a water pump. This is disclosed in EP 1 830 045 B1. This viscous coupling between the drive pulley and the pump shaft engages the pump when the coolant temperature rises. One drawback is that this arrangement is entirely dependent on the engine coolant temperature and cannot be engaged manually. The default position is disengaged.

It is also known to use an electromagnetically actuated coupling between the drive pulley and a water pump shaft. This is disclosed in U.S. Pat. No. 5,076,216. The electromagnet engages the water pump shaft to the drive pulley when a control current is applied. This is also an expensive solution and the default position is disengaged. Therefore, in the event of a partial or total electrical system failure, the water pump does not operate, which can result in significant engine damage.

It has also been known to use an electric motor to push a pulley into contact with the drive belt. This is disclosed in U.S. Pat. No. 5,603,289. A shaft is radially moved by a motor to come into or out of contact with an accessory drive belt, or is translated via an Acme screw rotated by the motor. However, this arrangement requires additional space, and either the pulley or belt must be able to be moved. Again, in the event of an electrical system failure, if the pump is not engaged, it will remain disengaged.

SUMMARY

According to the invention, it would be desirable to provide a switchable drive pulley system which allows the shaft of the accessory device to be disconnected from the accessory drive belt when desired. This reduces parasitic horsepower draw, as well as allows the accessory to remain off when it is not needed.

According to the invention, this is accomplished by providing a switchable drive pulley system that allows driving engagement or disengagement of a pulley from the shaft of an accessory drive. The pulley is mounted to the shaft by a bearing having an inner ring that rotates with the shaft and an outer ring that rotates with the pulley. A friction disk is arranged adjacent to the bearing inner ring and outer ring. When axial pressure is applied to the friction disk, relative motion between the inner and outer bearing rings is stopped, allowing the transfer of torque from the pulley to the shaft in order to drive the accessory drive, with the pulley and shaft rotating at the same speed. When pressure is removed from the friction disk, the pulley and the outer bearing ring can spin independently of the inner ring and shaft. The shaft can therefore remain stationary while the pulley continues to turn driven by the accessory belt drive.

In a preferred embodiment, the axial pressure is applied via a thrust bearing utilizing a stationary spring so that the friction disk spins with the pulley. The spring force can be removed by axially shifting the thrust bearing away from the friction disk and pulley.

In a preferred embodiment, the spring is arranged between the accessory drive housing and an axially displaceable actuator sleeve which presses against the thrust bearing. Preferably, the actuator sleeve includes a cam slot which rides on a pin mounted on the accessory housing, such that rotation of the actuator sleeve causes it to be axially shifted away from the friction disk.

In a preferred embodiment, an electrically actuated solenoid or a push-pull control cable connected to a solenoid or other mechanism is connected to the actuator sleeve, and is controlled via the engine control module in order to engage or disengage the pulley with the accessory drive shaft.

In an alternate embodiment, the actuator sleeve is axially shifted by a yoke actuated by a solenoid or other means.

Preferably, the bearing between the pulley and the shaft is a ball bearing. in order minimize friction. In a preferred embodiment, the accessory drive is a water pump and the actuator sleeve is used to disengage the friction disk from the pulley-to-shaft bearing at engine start up in order to allow the internal combustion engine to heat up more quickly so that emissions are reduced.

Further aspects of the invention, which can be used alone or in combination, are described in detail below.

BRIEF DESCRIPTION OF THE DRAWINGS

The foregoing summary and the following detailed description will be better understood when read in conjunction with the appended drawings, which illustrate a preferred embodiment of the invention. In the drawings:

FIG. 2 is a cross-sectional view shown in perspective of the switchable drive pulley system of FIG. 1;

FIG. 3 is an enlarged, partial cross-sectional view showing the switchable drive pulley system of claim 1 in the engaged, driving position; and FIG. 4 is an enlarged cross-sectional view similar to FIG. 3 showing the switchable drive pulley system of FIG. 1 with the pulley disengaged from the shaft.

DETAILED DESCRIPTION OF THE PREFERRED EMBODIMENT

Figure 1:
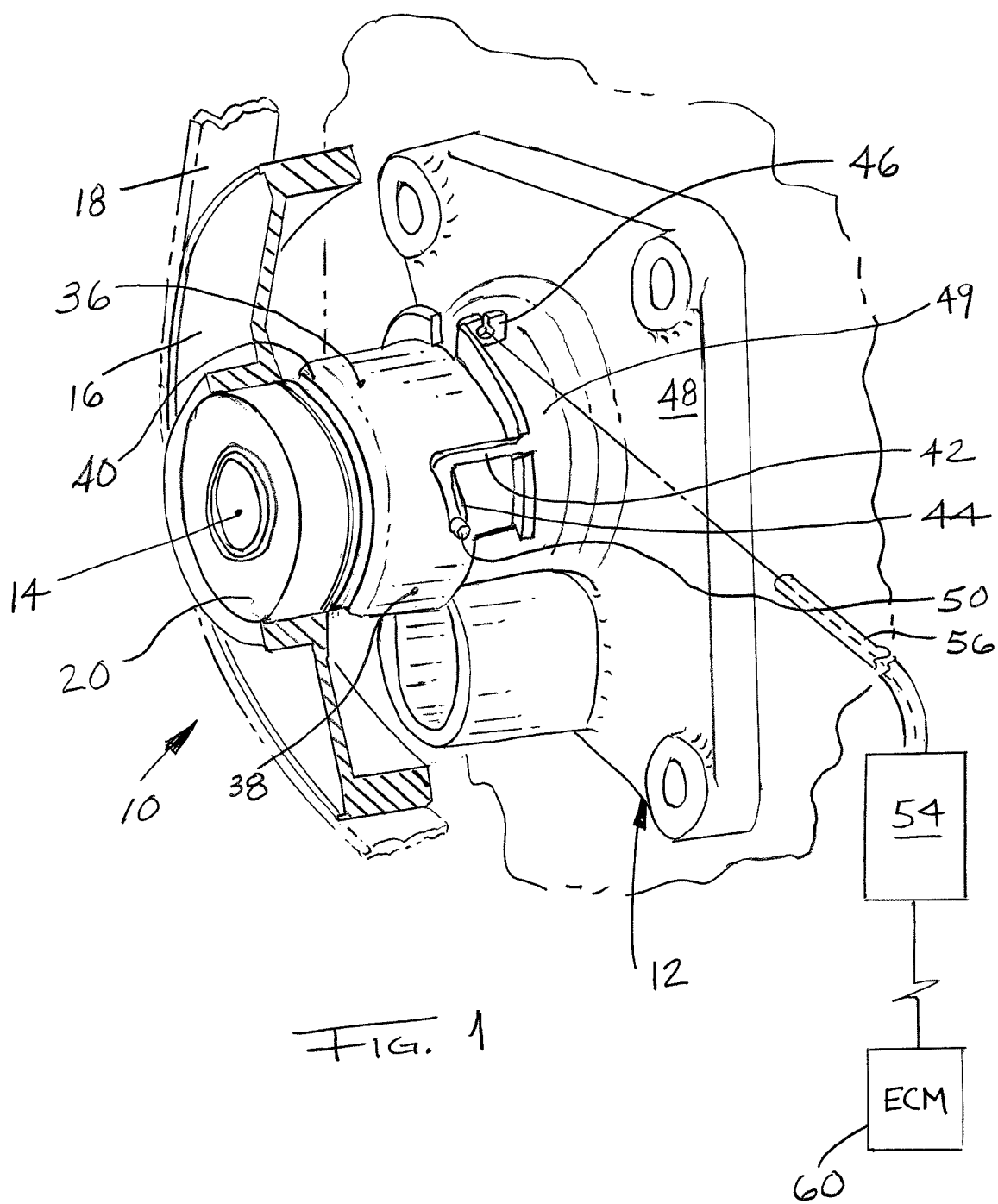
FIG. 1 is a perspective view, partially cut away of the switchable drive pulley system in accordance with the present invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least on of A, B or C" where A, B and C represent the items being listed, means any single one of the items, A, B and C, or combination thereof. This terminology includes the words specifically noted above, derivatives thereof and words of similar import.

Referring to FIG. 1, a switchable drive pulley arrangement 10 is shown, and includes an accessory drive 12, which in the preferred embodiment is a water pump, having a shaft 14 on which a pulley 16 is mounted. The pulley 16 is driven by a belt 18, preferably connected to a drive pulley on the crankshaft of an internal combustion engine, in order to transmit torque to the accessory drive 12.

In the preferred embodiment, a rolling bearing 20 is arranged between the shaft 14 and the hub of the pulley 16. The bearing 20 is preferably a ball bearing and includes an inner bearing ring 22 and an outer bearing ring 24 with races for the balls used as low friction rolling elements. The inner ring 22 is fixed to the shaft 14 and the outer ring 24 is fixed to the hub above the pulley 16, preferably via a press fit. A friction disk 26 is located adjacent to the inner and outer rings 22, 24 of the bearing 20. Preferably, the side faces of the bearing rings 22, 24 are coated with a friction material in the contact area for the friction disk 26.

A thrust bearing 28, preferably in the form of a needle bearing is located adjacent to the friction disk 26. The thrust bearing includes raceways 30, 32 and needles 34 held by a cage. The thrust bearing 28 presses against the friction disk 26.

An actuator sleeve 36 is located adjacent to the thrust bearing 28. The actuator sleeve 36 includes a hollow cylindrical body 38 along with a flanged end 40. Preferably, the raceway 32 of the thrust bearing 28 engages with the flanged end 40. As shown in FIG. 1, a slot 42 is arranged in the hollow cylindrical body 38 and includes an axially extending portion and an angled actuating portion 44, which acts as a cam for moving the actuator sleeve 36 axially by rotating the actuator sleeve 36. An actuator connection tab 46 is located on an engine side end flange of the actuator sleeve 36. The cylindrical body 38 of the actuator sleeve 36 is sized to be axially slidable on the protruding shaft support 49 of the accessory drive housing 48. A pin 50 protrudes from the shaft support portion 49 of the accessory drive housing 48 and the actuator sleeve 36 is arranged so that the pin 50 is located within the slot 42.

A compression spring 52 is located between an end of the shaft support 49 on the accessory drive housing 48 and an inside of the flanged end 40 of the actuator sleeve 36. The compression spring 52 forces the actuator sleeve 36 with the attached thrust bearing 28 toward the friction disk 26, so that it applies pressure to the friction disk 26, which engages both the inner and outer rings 22, 24 of the bearing 20, causing the pulley 16 to rotate with the shaft 14.

As shown in FIG. 1, preferably an actuator 54 is connected via a pull only or a push-pull cable assembly 56 to the actuator connection tab 46 on the actuator sleeve 36. The cable assembly 56 is preferably a push-pull type cable and the actuator is an electrically actuable solenoid or motor for either pushing or pulling the inner cable of the cable assembly 56 to rotate the actuator sleeve 36 between a position in which the spring 52 presses the thrust bearing 28 against the friction disk 26, causing the inner and outer rings 22, 24 of the bearing 20 to rotate together, or a disengaged position, as shown in FIG. 4, where rotation of the actuator sleeve 36 causes the flanged end 40 to be axially displaced in a direction away from the friction disk 26, further compressing the spring 52 such that the friction disk 26 no longer causes the outer ring 24 of the bearing 20 to rotate with the inner ring 22. In this position, as shown in FIG. 4, the pulley 16 is free to rotate with the drive belt 18 on the bearing 20 while the shaft 14 remains stationary.

In the preferred embodiment where the shaft 14 drives a water pump impeller 62, shown in FIG. 2, the actuator 54 is connected to the engine control module 60, which causes the actuator sleeve 36 to disengage the friction disk 26 from the inner and outer bearing rings 22, 24 so that the water pump shaft 14 and impeller 62 are not in driving connection with the pulley 16 as the engine is warming up. This is beneficial during engine startup in order to bring the engine to the operating temperature as quickly as possible in order to reduce emissions. In the event of any electrical system failure, the spring 52 causes the actuator sleeve 36 to press the friction disk 26 against the inner and outer bearing rings 22, 24 so that the default position is where the water pump is driven.

This arrangement can also be used in connection with other drive accessories, such as an alternator, air conditioning compressor, air pump or other drive accessories typically found on internal combustion engines.

It is also possible to use a splined friction disk that engages mating splines in the accessory drive shaft so that the friction disk is drivingly engaged to the shaft, and therefore only needs to frictionally engage the outer bearing ring 24 in order to transfer driving torque from the belt drive to the drive accessory.

Additionally, those skilled in the art will recognize that the actuator sleeve 36 can be axially displaced via other means, such as a direct solenoid or a magnetic actuator and is not limited to the use of a cam slot-pin arrangement as described and shown.

While the preferred embodiment has been described above, those skilled in the art will recognize that the invention allows for the use of some or all of the above features in various combinations.

What is claimed is:

1. A switchable drive pulley system that allows driving engagement or disengagement of a pulley from a shaft, comprising:
    a pulley mounted to a shaft by a bearing having an inner ring that rotates with the shaft and an outer ring that rotates with the pulley;
    a friction disk arranged axially adjacent to the bearing inner ring and outer ring;
    an actuator for applying axial pressure to the friction disk, such that the friction disk engages both the inner and outer bearing rings and relative motion between the inner and outer bearing rings is stopped, allowing transfer of torque from the pulley to the shaft, and upon removal of the axial pressure from the friction disk, the pulley and the outer bearing ring can spin independently of the inner ring and the shaft.

2. The switchable drive pulley system of claim 1, wherein the actuator comprises an actuator sleeve located about the shaft that is axially moveable, the actuator sleeve has a generally cylindrical body and a flanged end facing the friction disk, and a spring is located between the flanged end and a fixed housing to bias the friction disk against the inner and outer bearing rings.

3. The switchable drive pulley system of claim 2, further comprising a thrust bearing located between the flanged end of the actuator sleeve and the friction disk.

4. The switchable drive pulley system of claim 3, wherein the thrust bearing is a needle bearing.

5. The switchable drive pulley system of claim 2, wherein actuator sleeve is rotatable about the shaft, the generally cylindrical body includes a cam slot and a pin extends from the housing into the cam slot, such that rotation of the actuator sleeve causes the cam slot to slide along the pin to axially displace the actuator sleeve.

6. The switchable drive pulley system of claim 5, further comprising a control actuator connected to the actuator sleeve to rotate the actuator sleeve in order to axially move the actuator sleeve against a force of the spring to a position to remove axial pressure from the friction disk.

7. The switchable drive pulley system of claim 6, wherein the control actuator is connected to an ECM, and the shaft is a water pump shaft for a water pump of an internal combustion engine, and the ECM actuates the control actuator to remove axial pressure from the friction disk during engine start-up in order to allow the engine to reach operating temperature more quickly.

8. The switchable drive pulley system of claim 1, wherein the friction disk engages at least one of the shaft or the inner bearing ring as the actuator applies axial pressure to the friction disk.

\* \* \* \* \*